2,986,031
FATIGUE TESTING MACHINE WITH TORSIONAL ELASTIC SPRING

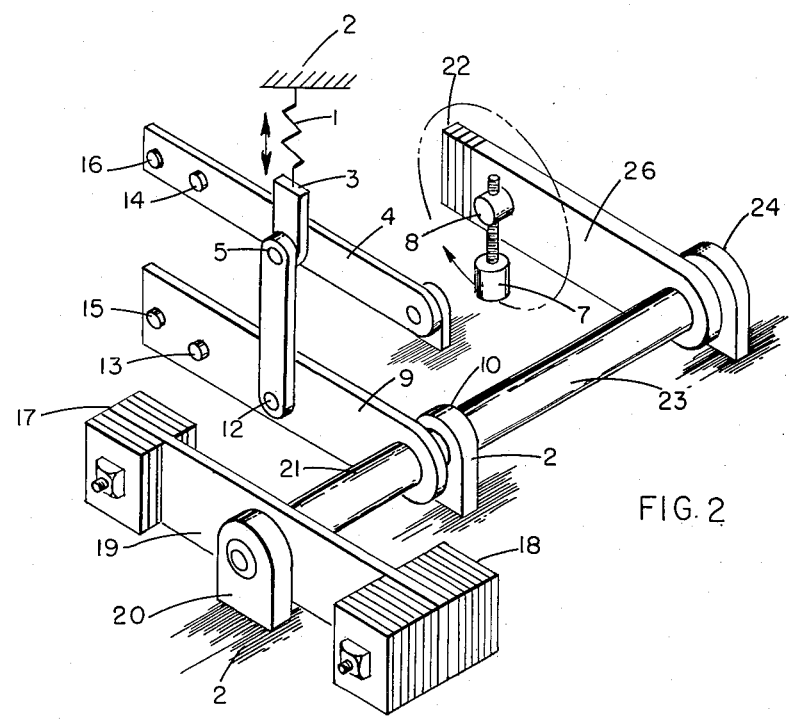
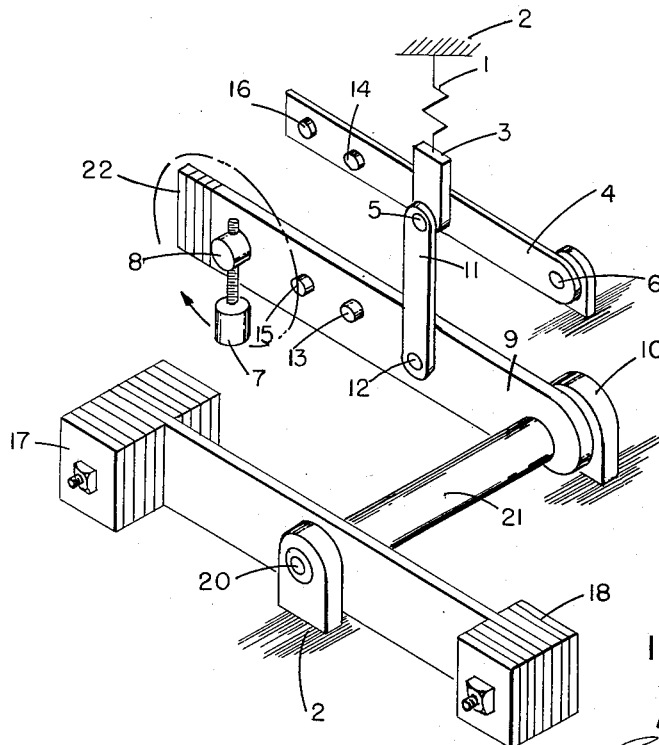

Alexander Yorgiadis, 17 Fuller Brook Road, Wellesley, Mass., and Ali Umit Kutsay, 155 Concord Road, Wayland, Mass.

Filed Nov. 12, 1957, Ser. No. 695,861
6 Claims. (Cl. 73—92)

This invention relates generally to mechanical fatigue testing machines and more particularly to those using torsion springs as the elastic elements in the machines.

While torsion springs, by the nature of their mechanical action, make it possible to construct fatigue machines that are far more versatile and universal than other types of machines now in use, yet the prior torsional spring machines have been functionally deficient in many respects.

One object of our invention is to provide a fatigue testing machine in which any static force, tension or compression, can be applied to a specimen and maintained constant irrespective of creep or extension of the specimen, and in which the static force adjustments do not affect the other adjustments in the machine such as the tuning, or the resonance amplification factor.

It is a further object of our invention to accomplish the above results in a fatigue testing machine without the use of elaborate control circuits or feedback devices, so that machines embodying our invention are also suitable for small size, low-cost applications.

Another object of our invention is to provide a fatigue testing machine in which it is possible to use dead weights to apply and maintain the static force in the specimen, without changing the effective dynamic mass of the loading members, thereby preventing the necessity of retuning an inertia compensated machine or of making frequency changes in a resonance machine.

Still another object of our invention is to provide a fatigue testing machine in which the static force is applied by means of dead weights and in which the elements are so functionally related as to allow a variable capacity, both as regards to force and to deflection at the point of specimen loading.

Other objects and advantages will be more apparent to those skilled in the art from the following description of the accompanying drawings in which:

Fig. 1 is a diagrammatic outline of a torsion spring type fatigue testing machine embodying our invention and in which static force is applied with dead weights and the alternating force in the specimen is maintained constant by inertia force compensation; and Fig. 2 is a similar type of machine embodying our invention and in which the static force is also applied by dead weights and in which the alternating force is produced by a resonant type mechanical system.

In the specific embodiments of my invention disclosed herein I have diagrammatically illustrated the component elements of purposes of simplicity. The machine as shown in Fig. 1 is operated as a constant-force fatigue machine. A test specimen 1, shown for purposes of illustration as a spring, is fixed at its upper end to the main base of the machine 2 (shown partially). The other end of the specimen is subjected to vibratory forces by a reciprocating head 3 to which it is fastened. A member 4 and pivots 5 and 6 constitute means for guiding the reciprocating head 3 so that it might move in as linear a path while oscillating, as practical.

The vibratory forces are produced by a mechanical oscillator 7, rotating at a synchronous speed about an axis 8. A dynamic oscillating beam or lever 9, which is operatively connected to oscillator 7, specifically by being carried directly thereon, is pivoted about an axis 10, and transmits the vibratory force to the specimen through a linkage 11 and a pivot 12. We are able to obtain a variable capacity by allowing any one of several leverages to be used to test specimen 1 by simply installing linkage 11 and head 3 at other positions, namely, on pivots 13 and 14 or pivots 15 and 16. This produces a machine of several ranges.

The static force in specimen 1 is adjusted and maintained by removable dead weights 17 and 18 at the two ends of lever 19 which extends freely in diametrically opposite directions from a torsion bar 21 so as to freely oscillate therewith. The weights are located at equal and diametrically opposite distances from the torsion bar axis. This lever is pivoted at a support 20, so that the axis of pivot 20 coincides with that of pivot 10. The two levers 9 and 19 are mechanically rigidly connected to the torsion bar 21, which has a common axis with pivots 10 and 20.

To change the static force in the specimen, weights are transferred from position 17 to position 18, or weights at position 18 are transferred to position 17, the weights being held to the lever 19 by any suitable clamping screws. The transfer from position 18 to 17 increases the tension force in the specimen, and the reverse transfer increases the compressive force. The static force in specimen 1 is the difference between weights 17 and 18. When weights in position 17 exceed those in position 18, the static force in specimen 1 is a tensile force. The static force is compressive when weights in position 18 exceed those in position 17. When the weights in position 17 are equal to those in position 18, the static force in the specimen is equal to zero, and fatigue tests under this condition are known as "reversed stress fatigue tests" in which the specimen is alternately stressed between two limits, one being in tension and the other being in compression of equal magnitude. With a particular machine, the maximum static-tension force is produced in specimen 1 when all removable weights are placed in position 17, and none are in position 18. Likewise, the maximum static-compression force is applied when all removable weights are placed in position. Any mechanical restraint arising from the use of pivots 5, 10, 12, and 20, or other types of pivots, is negligible so that the static force in the specimen, measured by the unbalance between weights 17 and 18, remains always a constant. This is an extremely desirable feature in our fatigue machine, since test specimens are known to creep or yield during the test. Other machines require periodic readjustment, which complicates the test or the equipment. It should be noted that even in reversed stress fatigue tests, when the static or mean force in the specimen is zero, the specimen may be statically deformed along the line of loading, either due to temperature changes caused by vibratory stressing or due to possible unequal creep characteristics in tension and in compression. For example, in other existing machines, if the temperature of the specimen rises, the resulting specimen expansion causes compressive static force errors in the specimen, which require automatic control devices for correction. In the machine of this invention, with weights 17 equal to weights 18 under reversed stress tests, the static force will always remain zero, specimen expansion being taken up through tilting of the static beam carrying weights 17 and 18.

Our machine produces constant alternating force in the specimen using the method of inertia force compensation. For instance, vibrating members 3, 4, 11, and 9 produce alternating inertia forces of an unknown magnitude that are neutralized by the elastic restraint of torque bar 21. To adjust the machine to this operation, specimen 1 is removed and the oscillator 7 is operated briefly at a very small force setting and with various numbers of weights 22 suitably removably secured on the end of lever 9. The particular number of weights 22 that produces the largest amplitude of vibration under these conditions will also produce accurate inertia force compensation when a specimen 1 is under test. It should be noted that weights 17 and 18 are just as important as weights 22 in establishing inertia force compensation condition for such a mechanical system. For example, if a number of weights 17 are removed from lever 19, they must be replaced on the other side with weights 18. These two sets of weights are equally distant from pivot 20, so that the overall "effective dynamic weight" of the static lever assembly remains unchanged even though the static forces produced in the specimen by the changed position of these weights is changed. In other words, as long as the total weight on the beam is unchanged, assuming the distance from pivot 20 remains constant as is the case in our invention, then we have a constant dynamic weight under a variable static force on the specimen. This is true for fatigue tests under static-tension force, when weights in position 17 exceed those in position 18, as well as for fatigue tests under static-compressive forces when weights in position 18 exceed those in position 17. It is also true for tests under reversed stress, when the static force is zero, and the weights in position 17 are equal in weight to those in position 18.

Inertia force compensation of the machine of Figure 1 is mathematically exact; that is, the oscillator force is exactly equal to the specimen force, times the leverage ratio. The mass of the fixed end of usual specimen holding fixtures (not shown) does not affect the test load. In prior machines using inertia force compensation, where the static force is produced by deflection of elastic springs, the alternating force in the specimen is not exactly equal to the force produced by the oscillator but must be corrected by a factor, depending on the mass ratio between the oscillating masses and the stationary masses in the machine. When relatively heavy fixtures are used, the force readings of the oscillator will be in error unless corrections are made.

The fatigue machine of Figure 1 is therefore unique for the following reasons: It enables constant alternating force in the specimen, even though its spring rate changes widely, necessitating variable amplitude of vibrations during the test. Superimposed on the alternating force, the machine also can apply any static force, tension, or compression by means of dead weights. The static force also remains constant, even though the specimen may yield during the test. No complicated tuning adjustments are necessary for the various types and magnitudes of preload, and all this is accomplished by purely mechanical devices without the aid of electronic controls, which are expensive and subject to possible malfunctions.

Finally, the machine can have one or more capacities, and can thus be used to test a wider variety of specimens than heretofore possible with one machine.

The structure of Figure 2 is another machine utilizing a similar arrangement as in Figure 1 with the exception that the principle of mechanical resonance is used to amplify the force produced by the oscillator. Because of the similarity between certain parts of the two machines, corresponding parts are given the same reference numbers. In the Figure 2 machine, specimen 1, loading head 3, guide 4, link 11, dynamic oscillating or loading beam 9, torque bar 21 (static lever 19, and dead weights 17 and 18 perform the same functions as in Figure 1. The oscillator 7 is, however, mounted on another lever 26 functioning as a resonance beam, and is operatively connected mechanically to the system through a second torque bar 23 which functions as a resonance torsion spring, and pivoted at 24 about the same axis as torque bar 21. The resonance beam is rigidly secured to the torsion spring 23.

The oscillator is driven at a variable speed depending upon changes of specimen characteristics, one of which is change of stiffness during the course of the test, or upon change of specimens, so that the vibrating system consisting of levers 26 and 9 are near resonance with the resonance torsion spring 23 and specimen 1. Tuning is also possible by adjusting the number of weights 22. Thus specimen 1 is subjected to an alternating force several times as large as that produced by the oscillator 7. This machine is unique in that it combinnes the following: (1) dead weight system for applying and maintaining the static force; (2) torsional spring loading for high amplitude operation; (3) mechanical resonance to amplify the oscillator force thus making it possible to apply large forces to the specimen with small mechanisms; and (4) several capacities or ranges.

It should be noted that all pivots in these figures are shown as bearings or pins. Actually, this is only for purposes of illustration, and all types of pivots, such as cross-flexures, single flexures, ball or roller bearings, or pin-pivots are usable and the type of pivot used depends upon the application, all as is well known in the art or as shown in Kutsay application Serial No. 501,469, filed April 15, 1955, now Patent No. 2,882,720.

From the foregoing disclosure it is seen that I have provided a torsion spring type fatigue machine in which the novel functional relation of the elements effects an improved mode of operation and new results.

It will, of course, be understood that various changes in details of construction and arrangement of parts may be made by those skilled in the art without departing from the spirit of the invention as set forth in the appended claims.

We claim:
1. A fatigue machine comprising, in combination, a torsion bar mounted for oscillation about its longitudinal axis, a dynamic oscillating beam rigidly connected substantially normal to one end of said bar, an oscillator operatively connected to the dynamic beam so as to cause oscillation thereof, an oscillatory head adapted for connection to one portion of a specimen while another portion of said specimen is connected to supporting means, means for guiding said head in a substantially linear path, means for connecting said head to a point of the dynamic beam to transmit oscillations from the beam to the head with a predetermined leverage, a static force beam rigidly connected to the other end of the torsion bar and extending freely in diametrically opposite directions from the torsion bar axis so as to freely pivot therewith, and weights mounted on the static beam at equal and diametrically opposite distances from the pivot axis of the torsion bar.

2. The combination set forth in claim 1 further characterized in that the oscillator is carried directly by the dynamic oscillating beam at a distance from the pivotal axis of the torsion bar so as to cause oscillation of the beam, the torsional vibration system consisting of the static beam, dynamic beam, torque bar and specimen head being in resonance when the specimen is removed from the machine.

3. The combination set forth in claim 1 further characterized by the provision of means whereby the leverage of the connection between the head and dynamic beam can be varied to effect an increase of amplitude of, and a decrease of force transmitted to, the head, or vice versa.

4. The combination set forth in claim 1 further characterized in that the weight on one end of the static beam is greater than on the other end, thereby to effect a predetermined static force on the specimen.

5. The combination set forth in claim 1 further characterized by the provision of a torsional resonance spring having one end connected to the end of the torsion bar to which the dynamic beam is connected, a resonance beam connected to the other end of the resonance spring, and the oscillator being connected to the resonance beam and thereby being operatively connected to the dynamic beam through said torsional resonance spring.

6. The combination set forth in claim 1 further characterized by the provision of a torsional resonance spring having one end connected to the end of the torsional bar to which the dynamic beam is connected, a resonance beam connected to the other end of the resonance spring, the oscillator being connected to the resonance beam and thereby being operatively connected to the dynamic beam through said torsional resonance spring, and an adjustable mass on said resonance beam.

References Cited in the file of this patent

UNITED STATES PATENTS

| | | |
|---|---|---|
| 1,827,560 | Binckley | Oct. 13, 1931 |
| 2,591,444 | Lazan | Apr. 1, 1952 |
| 2,693,699 | Federn | Nov. 9, 1954 |
| 2,882,720 | Kutsay | Apr. 21, 1959 |

FOREIGN PATENTS

| | | |
|---|---|---|
| 675,755 | Germany | May 16, 1939 |
| 731,259 | Germany | Feb. 4, 1943 |